US008468501B2

(12) United States Patent
Subhraveti

(10) Patent No.: US 8,468,501 B2
(45) Date of Patent: Jun. 18, 2013

(54) PARTIAL RECORDING OF A COMPUTER PROGRAM EXECUTION FOR REPLAY

(75) Inventor: Dinesh Kumar Subhraveti, Milpitas, CA (US)

(73) Assignee: International Business Machines Corporation, Armonk, NY (US)

(*) Notice: Subject to any disclaimer, the term of this patent is extended or adjusted under 35 U.S.C. 154(b) by 449 days.

(21) Appl. No.: 12/764,923

(22) Filed: Apr. 21, 2010

(65) Prior Publication Data

US 2011/0264959 A1  Oct. 27, 2011

(51) Int. Cl.
*G06F 9/44* (2006.01)
*G06F 11/00* (2006.01)

(52) U.S. Cl.
USPC .................. 717/125; 717/124; 714/38.1

(58) Field of Classification Search
USPC .................. 717/124–135; 714/37, 38.1
See application file for complete search history.

(56) References Cited

U.S. PATENT DOCUMENTS

| | | | | |
|---|---|---|---|---|
| 5,870,607 A * | 2/1999 | Netzer | | 717/127 |
| 6,101,524 A * | 8/2000 | Choi et al. | | 718/102 |
| 6,658,594 B1 * | 12/2003 | Bui et al. | | 714/10 |
| 6,691,250 B1 * | 2/2004 | Chandiramani et al. | | 714/25 |
| 6,832,367 B1 * | 12/2004 | Choi et al. | | 717/130 |
| 6,854,108 B1 * | 2/2005 | Choi | | 717/125 |
| 7,380,235 B1 | 5/2008 | Fathalla | | |
| 7,506,318 B1 * | 3/2009 | Lindo et al. | | 717/130 |
| 7,644,396 B2 * | 1/2010 | Cohen | | 717/129 |
| 7,797,706 B2 * | 9/2010 | Browning et al. | | 718/107 |
| 7,840,787 B2 * | 11/2010 | De Pauw et al. | | 712/227 |
| 7,958,497 B1 * | 6/2011 | Lindo et al. | | 717/128 |
| 7,966,605 B1 * | 6/2011 | Di Fabbrizio et al. | | 717/127 |
| 8,112,671 B1 * | 2/2012 | Di Fabbrizio et al. | | 714/38.1 |
| 2007/0168995 A1 * | 7/2007 | Cohen | | 717/129 |
| 2007/0250820 A1 | 10/2007 | Edwards et al. | | |
| 2008/0046699 A1 * | 2/2008 | Pauw et al. | | 712/227 |
| 2008/0077934 A1 * | 3/2008 | Browning et al. | | 718/107 |
| 2008/0244325 A1 | 10/2008 | Tyulenev | | |
| 2008/0288558 A1 * | 11/2008 | De Pauw et al. | | 707/202 |
| 2008/0301651 A1 | 12/2008 | Seneski et al. | | |
| 2009/0144742 A1 * | 6/2009 | Subhraveti et al. | | 718/104 |

OTHER PUBLICATIONS

Ronsse et al., "RecPlay: A Fully Integrated Practical Record/Replay System," May 1999, ACM, pp. 133-152.*
Osman et al., "The Design and Implementation of Zap: A System for Migrating Computing Environments," Dec. 2002, Proceedings of the 5th Operating Systems Design and Implementation (OSDI 2002), pp. 1-16.*

(Continued)

*Primary Examiner* — Wei Zhen
*Assistant Examiner* — Qing Chen
(74) *Attorney, Agent, or Firm* — Rabindranath Dutta; Konrad, Raynes, Davda & Victor LLP

(57) ABSTRACT

A method, system and program product for recording a program execution comprising recording processor context for each thread of the program, results of system calls by the program, and memory pages accessed by the program during an execution interval in a checkpoint file. Processor context includes register contents and descriptor entries in a segment descriptor table of the operating system. System calls are recorded for each program thread, tracked by an extension to the operating system kernel and include returned call parameter data. Accessed memory pages are recorded for each program process and include data, libraries and code pages. The program address space, processor context, and program threads are reconstructed from checkpoint data for replaying the program execution in a different operating system environment.

17 Claims, 10 Drawing Sheets

OTHER PUBLICATIONS

Ronsse et al., "Record/Replay for Nondeterministic Program Executions," Sep. 2003, Communications of the ACM, pp. 62-67.*

Georges et al., "JaRec: a portable record/replay environment for multi-threaded Java applications," Feb. 24, 2004, John Wiley & Sons, Ltd., pp. 523-547.*

Janakiraman et al., "Cruz: Application-Transparent Distributed Checkpoint-Restart on Standard Operating Systems," 2005, IEEE.*

Orso et al., "Selective Capture and Replay of Program Executions," May 17, 2005, ACM, pp. 1-7.*

Laadan et al., "Transparent Checkpoint-Restart of Distributed Applications on Commodity Clusters," Sep. 2005, Proceedings of the 2005 IEEE International Conference on Cluster Computing (Cluster 2005), pp. 1-13.*

Saito et al., "Jockey: A User-space Library for Record-replay Debugging," Sep. 2005, ACM, pp. 69-76.*

Laadan et al., "Transparent Checkpoint-Restart of Multiple Processes on Commodity Operating Systems," 2007, USENIX Association, pp. 323-336.*

Subhraveti et al., "Record and Transplay: Partial Checkpointing for Replay Debugging," 2009, Department of Computer Science, Columbia University, pp. 1-16.*

S. Narayanasamy et al., "Bugnet: Recording Application-Level Execution for Deterministic Replay Debugging", IEEE Computer Society, dated 2006, pp. 1-10.

Luk et al., "Pin: Building Customized Program Analysis Tools with Dynamic Instrumentation", pp. 1-11, Jun. 2005, ACM.

Abstract for "Pin: Building Customized Program Analysis Tools with Dynamic Instrumentation", (online) retrieved at URL>http://apps.webofknowledge.com/outboundService.do?action=go, retrieved on Dec. 13, 2012, 1 pp.

J. Steven et al., "jRapture: A Capture/Replay Tool for Observation-Based Testing", Electrical Engineering & Computer Science Department, Case Western Reserve University, dated 2000, pp. 1-10.

"Research Disclosure Database No. 455001", Research Disclosure, dated Mar. 2002, pp. 1-3, Paper Source.

Abstract for "Problem Evaluation Method of Software Library Used in Operating System, Involves Recording Calls and Data Passed to Special Functions Embedded in Library and Recreating Behavior of Library Using Record of Calls and Data", dated Mar. 2002, pp. 1-2.,Derwent Information Ltd.

* cited by examiner

PARTIAL RECORDING OF A COMPUTER PROGRAM EXECUTION FOR REPLAY

FIELD OF THE INVENTION

The invention relates generally to computer software development, and more particularly, to a method, system and computer program product for partially recording a program execution and replaying the execution in a different operating system environment.

BACKGROUND

Software failures that occur in production are often difficult to reproduce due to differences between a production system and a development system. Reproducing a software failure is one of the most time consuming and difficult steps in resolving a software problem. A variety of operating systems, corresponding libraries and their versions, application tiers supplied by different vendors, and network infrastructure with different configuration settings make application environments complex and software failures hard to reproduce.

The source of the problem might be an incorrect assumption implicitly made by the application about the availability or configuration of local services such as domain names, deployed software components or library versions. Furthermore, non-deterministic factors such as timing and user inputs contribute to the difficulty in reproducing software failures. The common approach of conveying a failure report is often inadequate and time-consuming.

Some application vendors provide built-in support for collecting information when a failure occurs. Other sophisticated facilities may provide more comprehensive data including traces and internal application state. These facilities include program execution record and replay tools. Record and replay tools, however, are often limited in their ability to provide insight into the root cause of a problem because they represent the aftermath of the failure and not the steps that precede it. Furthermore, indiscriminate recording and transfer of data present additional data storage requirements.

Conventional record and replay techniques isolate the system calls made by an application and replay the results back to the application during replay. However this simplistic model is often inadequate. When an application is being replayed, it relies on a variety of third party libraries and install base. If the libraries needed by the application do not exist, or if the required libraries are installed but their versions are incompatible with the application, the replaying application might fail or diverge from its initial execution. Discrepancy in binaries is not limited to the auxiliary libraries used by the application. The versions of the installed application binaries themselves may be different and hence the application would exhibit an inconsistent behavior during replay.

In order to avoid binary incompatibilities, some record and replay systems require that the record environment and the replay environment are identical. However, this requirement often cannot be met. For instance, when the recorded log is replayed in a programmer's environment, the execution of an application might diverge because the programmer's environment might be configured differently. A discrepancy in the installed base, such as support libraries and DLL files, would impact replay and make it diverge from the originally recorded execution.

Data storage overhead is another consideration when recording memory pages. Conventional checkpointing techniques generally capture the complete state of an application for replay, including the state of file descriptors and various operating system resources. As a result, the amount of recorded data is relatively large which makes it necessary to impose dependencies on the replay environment, such as requiring the files in a persistent storage be available during a replay.

From the foregoing, it is appreciated that there still exists a need for efficiently recording the execution of a program and replaying the recording in a different operating system environment without the aforementioned drawbacks.

SUMMARY

The invention is directed to a method, system and computer program product for efficiently recording a program execution and replaying the execution in a different operating system environment. More particularly, the method, system and program product of the invention record processor context for each thread of the program, results of system calls made by each program thread, and memory pages accessed by each process of the program in a partial checkpoint. The checkpoint data is then used to reconstruct the program's execution state in a replay of the execution.

The details of the preferred embodiments of the invention, both as to its structure and operation, are described below in the Detailed Description section in reference to the accompanying drawings, in which like reference numerals refer to like parts. The Summary is intended to identify key features of the claimed subject matter, but it is not intended to be used to limit the scope of the claimed subject matter.

DETAILED DESCRIPTION OF THE INVENTION

Figure 1:
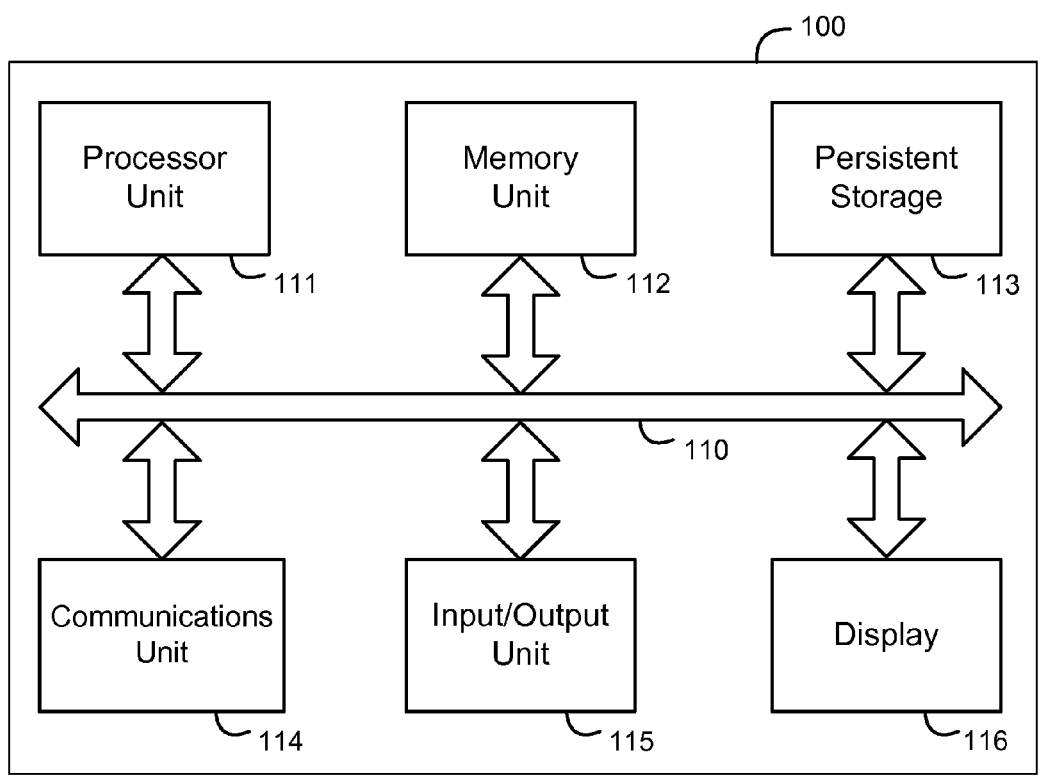
FIG. 1 is a block diagram illustrating a representative computer system in which aspects of the invention may be implemented.

The invention relates generally to a method, system and computer product for partial recording the execution of a program and playing back the recorded execution in a different operating system environment.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as JAVA™ (JAVA™ is a trademark or registered trademark of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Refer now to the drawings and in particular to FIG. 1, there is depicted a block diagram of a data processing system in which aspects of the present invention might be implemented. As shown, a data processing system 100 includes a processor unit 111, a memory unit 112, a persistent storage 113, a communications unit 114, an input/output unit 115, a display 116, and system bus 110. Computer programs are typically stored in persistent storage 113 until they are needed for execution, at which time the programs are brought into memory unit 112 so that they can be directly accessed by processor unit 111. Processor 111 selects a part of memory 112 to read and/or write by using an address processor 111 gives to memory 112 along with a request to read and/or write. Usually, the reading and interpretation of an encoded instruction at an address causes processor 111 to fetch a subsequent instruction, either at a subsequent address or some other address.

Figure 2:
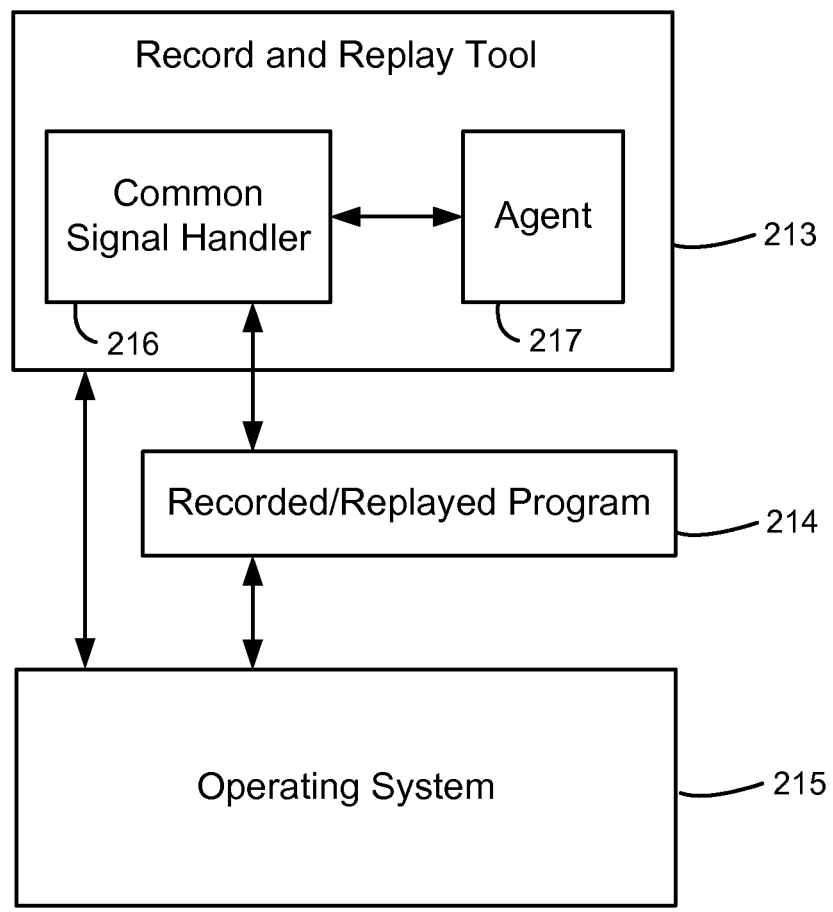
FIG. 2 is a block diagram showing an exemplary embodiment of a system for recording and replaying the execution of a program in accordance with aspects of the invention.

FIG. 2 illustrates a block diagram of an exemplary record and replay system according to aspects of the invention. A record and replay tool 213 is shown for recording the execution of a program 214. The record and replay tool 213 interacts with the underlying operating system 215 which is in communication with the program 214. As described below in reference to FIGS. 6-9, the record and replay tool 213 allows a recorded program execution to be replayed in an operating system different from that of the recording environment. For example, a program execution recorded in a Linux-based computer may be replayed in a Windows-based computer. Portions of the execution state of the program 214, including parts of the program and library code necessary to reproduce the execution, are automatically recorded during a recording interval.

The record and replay tool 213 comprises two key components for recording and replaying: a common signal handler 216 and an agent 217. The common signal handler 216 monitors and intercepts all incoming signals to the program 214, such those from external processes and program inputs. The agent 217 performs the recording and replaying based on input from the common signal handler 215. Details on the common signal handler 216 and agent 217 are described below with reference to FIGS. 4-9.

Figure 3:
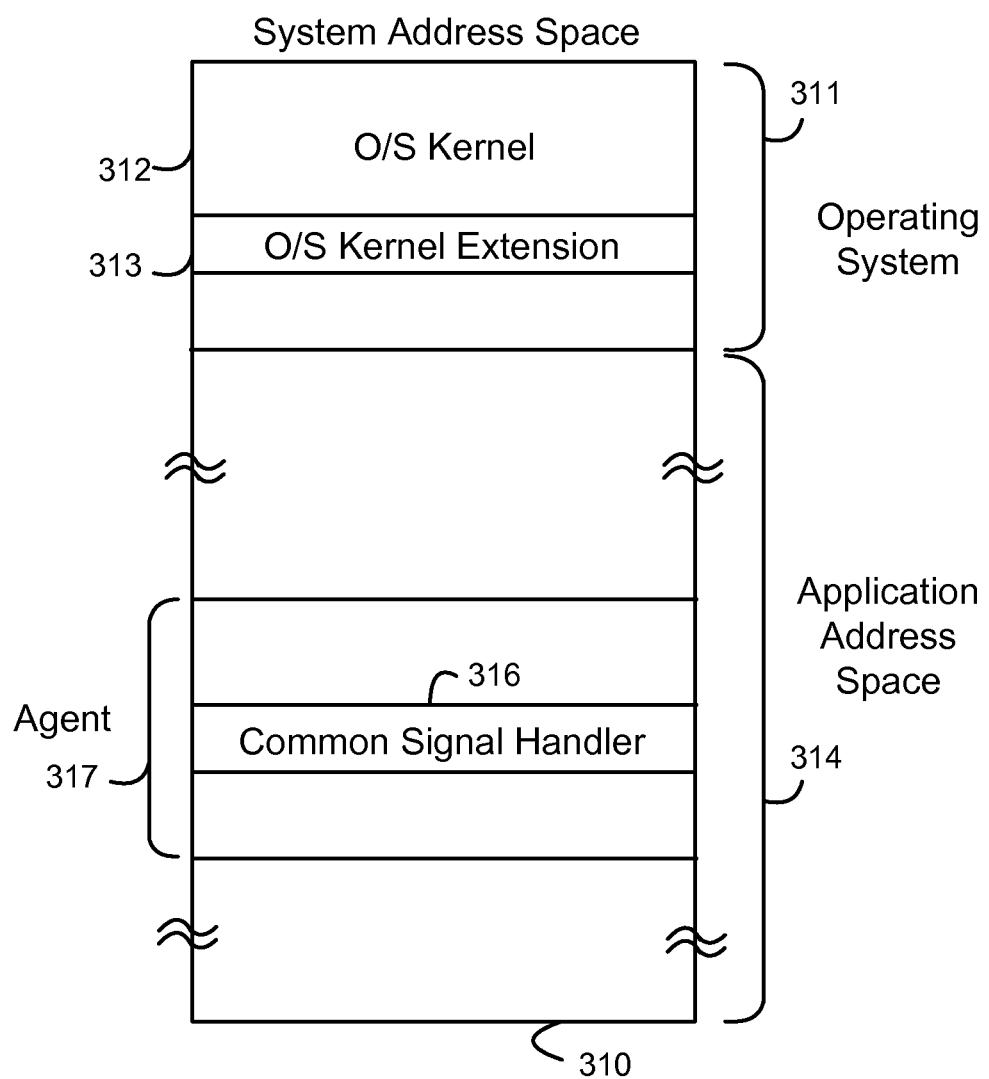
FIG. 3 is a memory map representing the system address space that includes components of a record and replay system and relevant portions of the operating system, in accordance with aspects of the invention.

FIG. 3 is a memory map showing a system address space 310 that includes components of the record and replay system 213 and relevant portions of an operating system 311. The operating system 311 has a kernel 312 and a kernel extension 313 to support the functions provided by the record and replay tool 213. The kernel extension 313 may be a "ptrace" utility for intercepting system calls and is available in certain Unix operating systems. The agent 317 of the record and replay tool 213 occupies a portion of the application address space 314. The common signal handler 316 might be provided as part of the agent 317, as shown.

Figure 4:
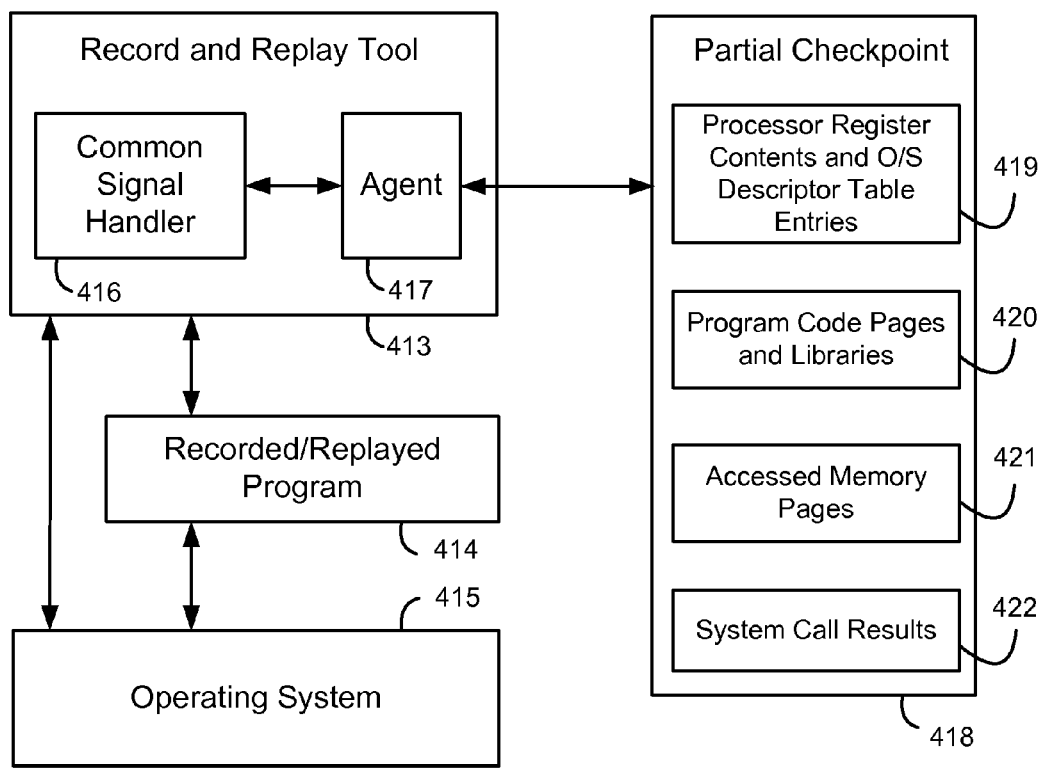
FIG. 4 is a block diagram showing a partial checkpoint generated by the record and replay system of FIG. 2 during a recording session, in accordance with aspects of the invention.

FIG. 4 illustrates an exemplary partial checkpoint file 418 generated by the record and replay system of FIG. 2 during a recording session, in accordance with aspects of the invention. The record and replay tool 413 may generate multiple partial checkpoints 418 of the program execution state during a recording interval which are then used for reconstructing the program 414's execution state in a replay. The checkpoint 418 represents a partial execution state of the program 414, rather than a complete execution state, to minimize the amount of data being recorded. Although the system memory footprint of the program 414 may be large, the program 414 typically accesses only a fraction of its execution state during any short execution period. As a result, the record and replay tool 413 captures only the most relevant application-level data and allows several partial checkpoints 418 to be recorded per second. The high checkpoint frequency allows for quick forward and backward movement of the program execution during a replay.

In addition, the recording of the execution of the program 414 is divided into periodic and contiguous time intervals. For each interval, the record and replay tool 413 records a partial checkpoint 418 for each process in the program 414 that the operating system 415 executes. The partial program execution state recorded in the checkpoint 418 includes an image of the system processor context. The processor context includes register contents and operating system descriptor entries 419. The record and replay tool 413 decouples the program 414 from installed code binaries by recording specific code pages 420 within executable files of the libraries accessed by the program 414 during the recording interval. The partial checkpoint 418 also includes memory pages 421 accessed by processes in the program 414 during the recording interval. The record and replay tool 413 further decouples the program 414 from the underlying operating system 415 by recording results of system calls 422 made by the program 414. During a replay, the record and replay tool 413 replays the recorded system call results rather than re-executing the system calls.

The partial checkpoint 418 is maintained in memory to minimize disk I/O and run-time overheads. Older partial checkpoints 418 may be discarded by the tool 413 to accommodate more recent checkpoints. Multiple partial checkpoints 418 accumulated in memory can be written to disk by stopping the current recording session. The mechanism for starting and stopping a recording session is described below with reference to FIGS. 5-9.

When the program 414 encounters a failure at the beginning of a recording interval, the most recent partial checkpoint 418 may not contain sufficient context for identifying the cause of the failure. In that case, the exemplary embodiments of the invention seamlessly splice a series of consecutive partial checkpoints 418 into a new partial checkpoint that encompasses the total length of the original checkpoints 418 and the failure.

Figure 5:
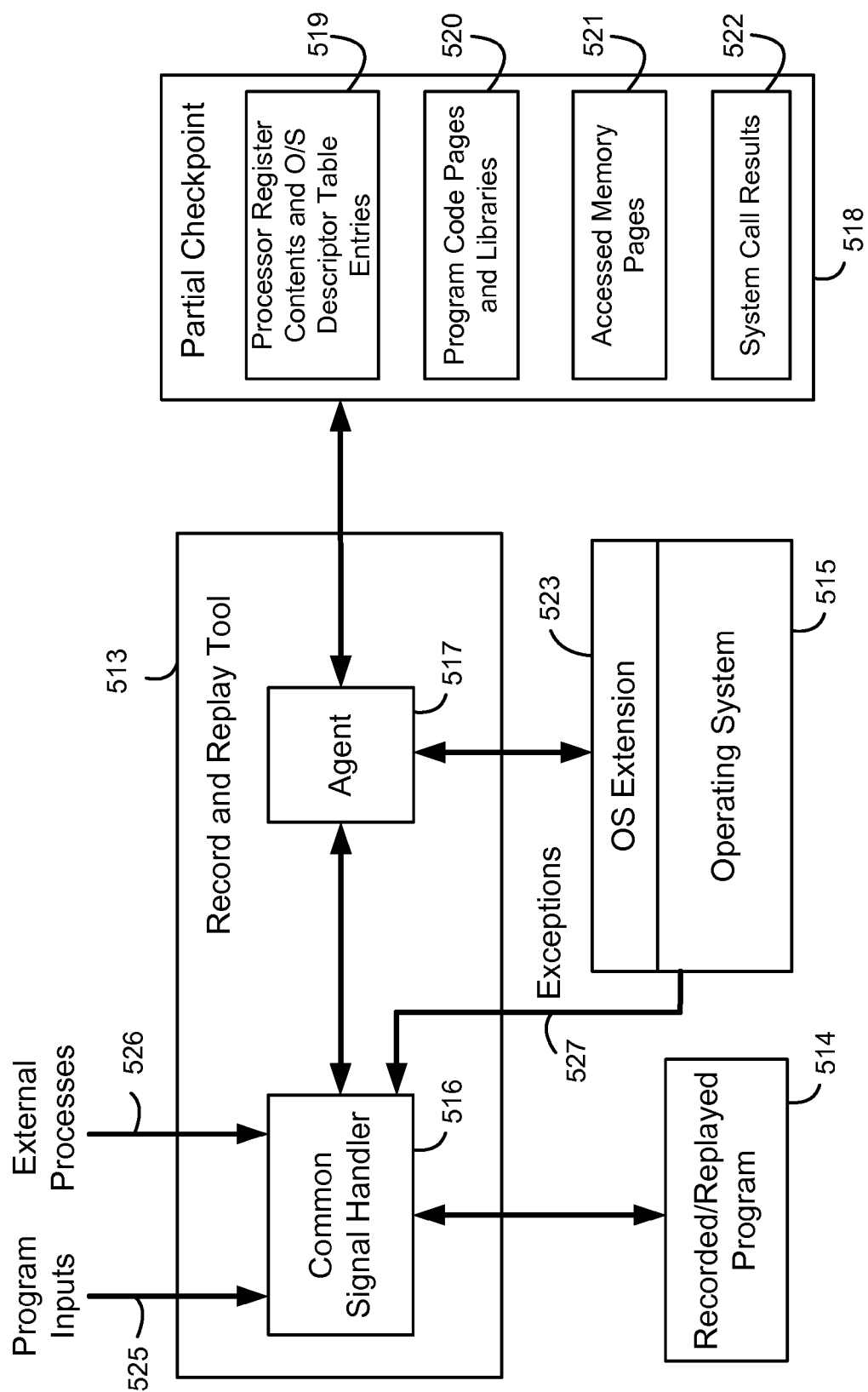
FIG. 5 is a block diagram illustrating another exemplary embodiment of the record and replay system of the invention, with an O/S kernel extension for tracking system calls made by the recorded program, in accordance with aspects of the invention.

FIG. 5 shows another exemplary embodiment of the record and replay tool 513 of the invention, with an operating system extension 523 through which the record and replay tool 513 interfaces with the operating system 515, in accordance with aspects of the invention. The agent 517 of the record and replay tool 513 provides basic "Start" and "Stop" commands for controlling the recording of a program execution. These commands start and stop a recording based on input that the agent 517 receives from the common signal handler 516. Although FIG. 5 shows the agent 517 and program 514 separately, the agent program 517 might be running in the program 514's address space. By having the agent 517 and program 514 occupy a shared memory region, they allow for quick transition of control from the program 514 to the agent 517 when program events occur that would trigger relevant data to be recorded in the partial checkpoint 518.

The common signal handler 516 intercepts and processes all incoming signals to the program 514, including program inputs 525 and external processes 526, before forwarding them to the program 514. The common signal handler 516 also intercepts exceptions 527, such as those caused by failures in the program 514, and enables an external process 526, e.g., a user interface, to communicate with the agent 517 to start and stop a recording session by the record and replay tool 513.

The agent 517 tracks the program 514's system calls by providing an operating system kernel extension 523 to a system call tracing component of the operating system 515. A system call component, like "ptrace", allows an originating program thread to be signaled when a system call is made. Ptrace is a system call utility available in many versions of the Unix operating system which allows one process to control another, enabling the controlling process to inspect and manipulate the internal state of its target process. The agent 517 processes the system call by reading and writing to the thread's registers in the operating system that relate to the system call's parameters. The agent's shared memory region is mapped across all program processes at the same address, and the agent persists across exec system call by intercepting it and performing the exec operation in user space while retaining the region it is occupying.

Recording

A recording of a program execution includes the program's processor context and inputs to the program. The recorded data allows the memory state of the program during execution to be reconstructed in a replay. The recording is done for each thread in the program, includes the program's processor state, and is stored in the respective processes of the program.

Figure 6:
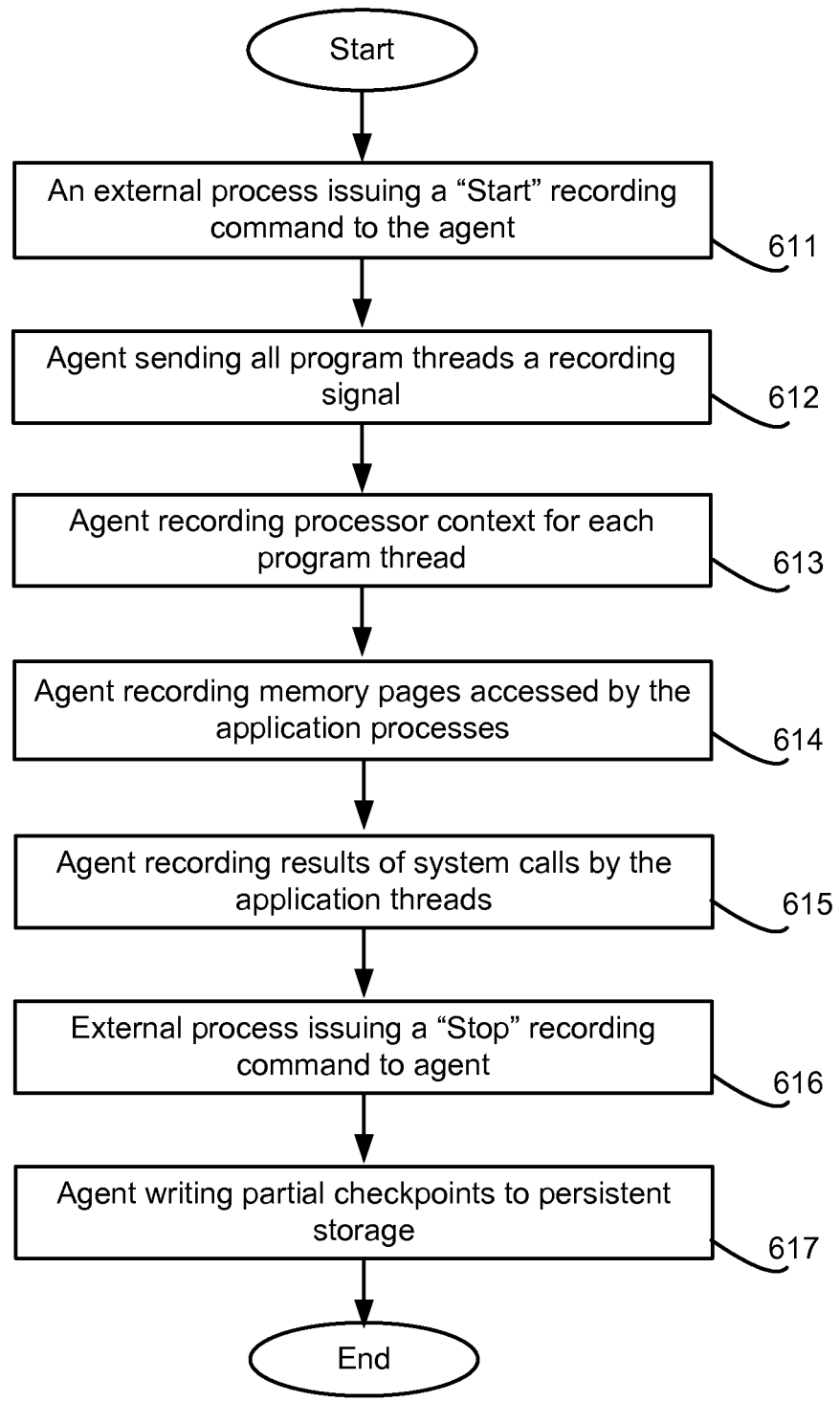
FIG. 6 is a flow chart representing a high level and exemplary process of recording a program execution, in accordance with aspects of the invention.

FIG. 6 shows a flow chart of an exemplary process for recording a program execution. At block 611, an external process, such as a user interface, issues a "Start" recording command to the agent 517 of the replay and record tool 513 to begin a recording session. The agent 517 sends a recording signal to all running threads in the program 514, at block 612. At block 613, the agent 517 saves processor context 519 for each program thread in the partial checkpoint 518. The processor context marks the initial point of the thread's execution during replay and consists of system register contents and the processor's memory state 519, which includes segment descriptor entries in the segment descriptor tables of the operating system.

After recording the processor context, the agent 517 starts monitoring the program's interfaces to capture program inputs, including the memory pages accessed by the program 514 and data relating to system calls made by the program 514. At block 614, the agent 517 records the memory pages that are accessed by the processes in the program 514 in the partial checkpoint file 518. Details on an exemplary process for identifying and recording the accessed memory pages are described below with reference to FIG. 7. The results of the system calls made by the running threads in the program 514 are also recorded in the partial checkpoint 518 by recording tool 513, at block 615. Details on an exemplary process for saving the system call results are described below with reference to FIG. 8. The program execution continues to be recorded by the recording tool 513 until the agent 517 receives a "Stop" command from an external process, per block 616. At that point, the agent 517 writes the partial checkpoints 518 that have accumulated in system memory to persistent storage, at block 617. In case of a program fault, the agent 517 also writes to persistent storage a set of partial checkpoints 518 taken before the fault. In recording a multi-process program, the partial checkpoints 518 are saved separately for each process, along with information identifying the process that had the failure.

Recording Accessed Memory Pages

Figure 7:
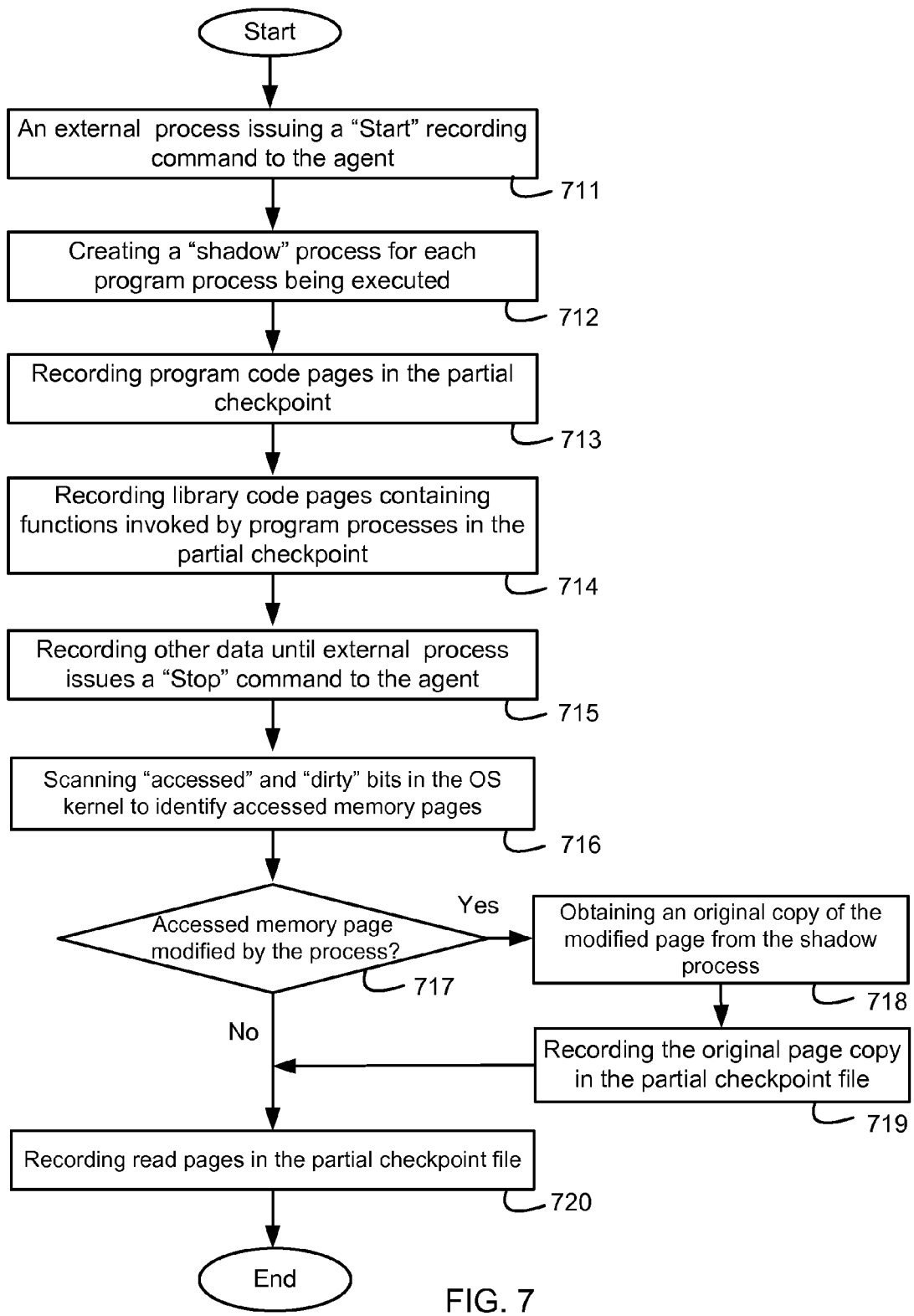
FIG. 7 is a flow chart representing an exemplary process for recording program code pages and memory pages accessed by the program being recorded, in accordance with aspects of the invention.

FIG. 7 is a flow chart representing an exemplary process for recording accessed memory pages, in accordance with aspects of the invention. At block 711, the agent program 517 of the record and replay tool 513 receives a "Start" command signal from an external process, such as a user interface, to start a recording session. In the exemplary embodiments of the invention, only memory pages that are read by the program 514, but not those written, are recorded in the partial checkpoint 518. If a memory page is modified by the program 514, then the original copy of the page rather than the modified copy is recorded. A copy of the original page may be obtained from a "shadow" process of a particular program process, as created at block 712. A shadow process of a parent process in the program 514 is created at the beginning of each recording interval. It shares all resources with the parent process except for virtual memory and acts as a backup copy of the parent process. At the end of the recording interval, the agent 517 examines the "accessed" and "dirty" bits of each page in a process address space and obtains the original copies of the dirty pages from the respective shadow process.

At block 713, the agent 517 of the record and replay tool 513 stores program code pages in the partial checkpoint 518. The agent 517 also stores code pages of the libraries containing the functions invoked by the processes of the program 514 during the recording interval, at block 714. At block 715, the agent 517 continues recording other relevant data, such as system call results described with reference to FIG. 8, until the agent 517 receives a "Stop" recording command from an external process. At that point, the agent 517 scans the "accessed" bits and "dirty" bits maintained by the operating system kernel to determine the memory pages that were accessed by the program 514 during the recording interval, per block 716. If a page was modified during the program execution per the determination in block 717, then a copy of the original page is obtained from a corresponding shadow process, at block 718. The original copy, rather than the modified page, is recorded in the partial checkpoint at block 719. The read memory pages are also stored in the checkpoint 518 at block 720.

The accessed memory pages of a partial checkpoint might be kept in a data structure that includes unique page addresses associated with page data. At the end of the recording interval, the "stop" primitive queries the operating system (515) kernel to determine which pages in the process' address space have been accessed. If a page was read by the program, its address is added to an initial page set with null page data.

Recording System Call Data

Relevant program events, in particular system call data, are recorded in a continuous log which is used to control the replay of the program 514. In the exemplary embodiments of the invention, the kernel extension 523 to the operating system 515 monitors and intercepts system calls made by each thread in the program 514. When a system call is made, the extension 523 alerts the agent 517. The agent 517 then records results of the system call in the partial checkpoint 518, preferably as a record in an ordered list for that thread. The record contains a system call returned value and data returned to the program 514 through system call parameters. The returned value and data in the parameters are captured as unstructured binary data and provided to the program 514 during a replay in the same format.

Figure 8:
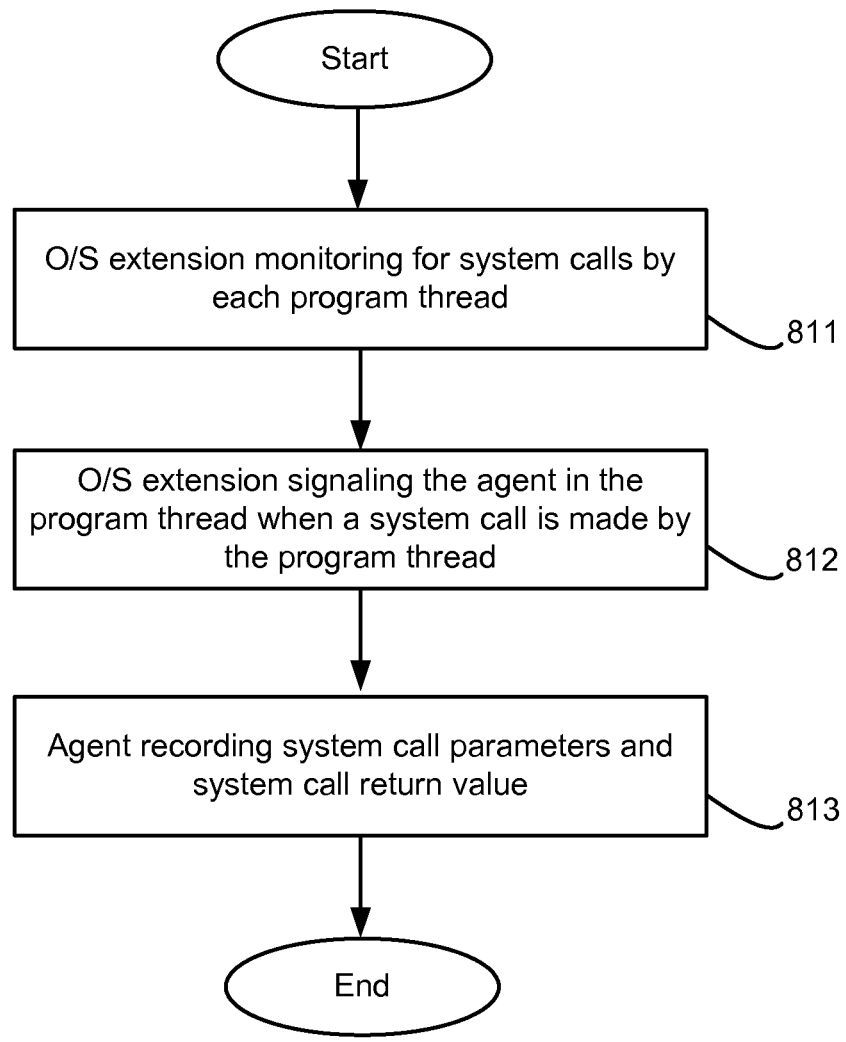
FIG. 8 is a flow chart representing an exemplary process for recording the results of the system calls invoked by the program being recorded, in accordance with aspects of the invention.

FIG. 8 is a flow chart representing an exemplary process for recording results of the system calls invoked by the program 514 during the recording session. At block 811, the kernel extension 523 starts monitoring for system calls by each running thread of the program 514. When a program thread makes a system call, the extension 523 alerts the agent in the program thread making the system call, per block 712. At block 813, the agent 517 records the call return value and data returned in the call parameters in a system call log for the respective thread.

Replaying

The recorded partial checkpoints 518 may be used to replay a program (514) execution for archiving, security and performance analysis, or reproducing and analyzing a program failure. The replay might be in an operating system different from that of the recording environment. For example, a recording made in a Linux system may be replayed in a Windows system. The replay is also independent of the installed libraries because the program binary pages were captured directly from the source system. In a replay, the entire program 514 does not need to be replayed as the partial checkpoints 518 were recorded for each process of the program 514. Instead, a user could select a process during which the failure occurred and replay just that process. The user can go as far back as necessary in the checkpoints 518 to reach the problem source. An arbitrary point within a recording interval can be reached by forwarding from the latest checkpoint prior to the desired execution point, thus simulating a reverse execution.

Replaying system call results 522 is done independently of the operating system 515 by the agent 517 of the exemplary embodiments, on behalf of the program 514. The program 514 thus does not directly contact the operating system 515 during a replay. As long as the program 514 receives consistent responses to the system calls that it makes during the replay, it continues to run as expected. Since the user space portions of a program's execution do not depend on the kernel services, they can be executed independently in an operating system 515 different from that of the recording environment.

Figure 9:
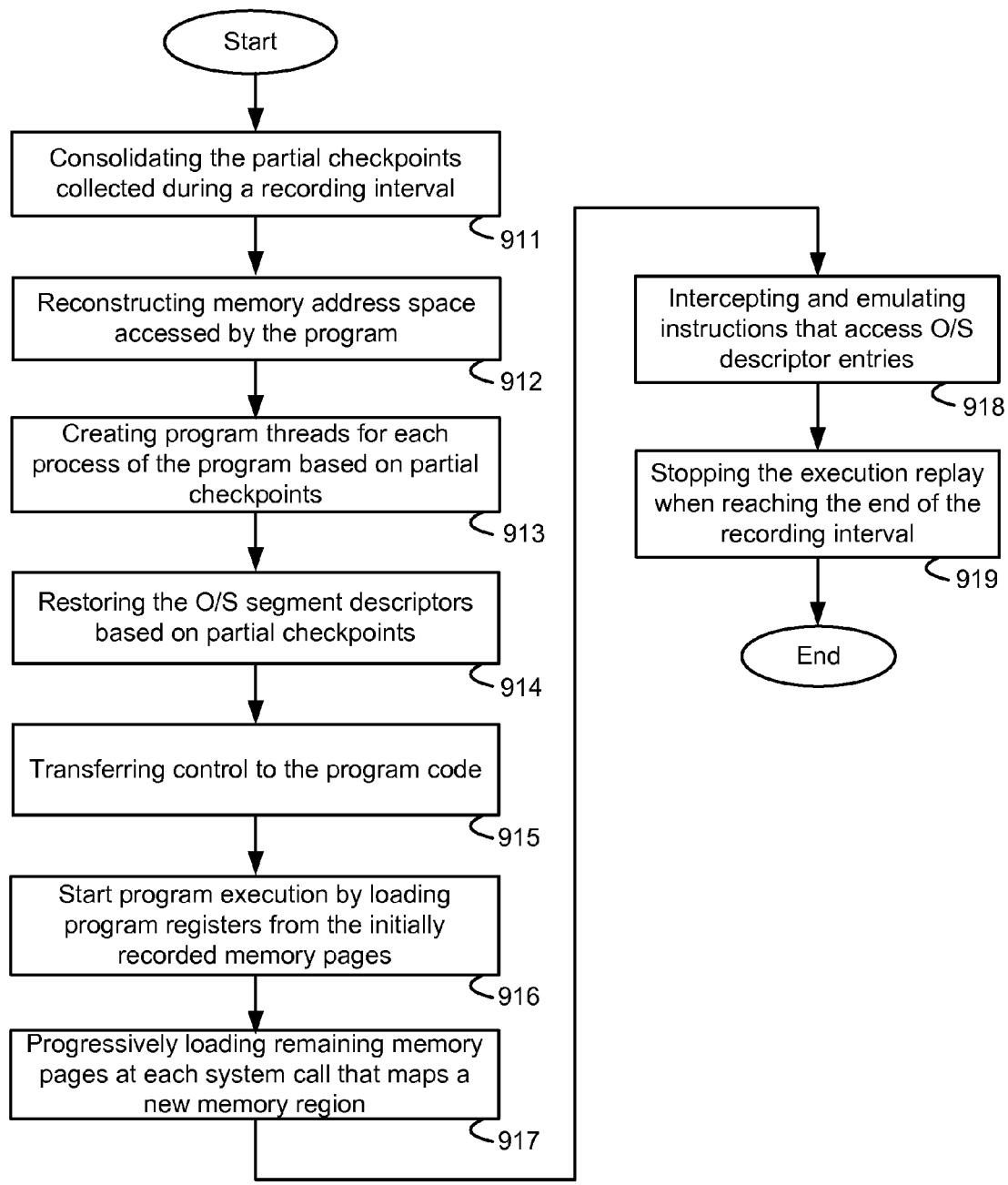
FIG. 9 is a flow chart representing an exemplary process for replaying a previously recorded program execution using partial checkpoints, in accordance with aspects of the invention.

FIG. 9 is a flow chart representing an exemplary process for replaying a recorded program execution. Initially, the partial checkpoints 518 collected during a recording interval are consolidated at block 911. The memory address space of the program 514 during the recording interval is reconstructed using the recorded accessed memory pages in the consolidated checkpoints 518, at block 912. After restoring memory regions, the agent 517 of the record and replay tool 513 creates the program threads for each program process during the recorded execution, per block 913. Each new thread initializes itself and restores its specific state from the recorded data. The thread restores the segment descriptors 519 which were saved in the thread's respective log of the recorded checkpoint 518, at block 914. Once the states of the program threads are restored, the agent 517 transfers control to the program code at block 915.

The replay of the recorded program execution begins at block 916 with the initial memory pages loaded into system memory. The initial memory pages are the initially recorded pages of individual partial checkpoints 518. The memory pages accessed by the program 514 are progressively loaded into system memory as needed, from system call records 522, at each system call that maps a new memory region into a process address space (block 917). If a program instruction accesses entries in an operating system descriptor table, then the agent 517 intercepts the instruction at block 918 and emulates the particular instruction in the replay system to avoid any memory conflicts between the recording and replaying systems. If the log in the checkpoint 518 indicates that the execution involves shared memory interaction with other processes, then all processes participating in the interaction are identified and started from their respective partial checkpoints 518. Each individual process is partially reconstructed as previously described. The agent 517 continues to monitor the program 514 until its execution reaches the end of the recording interval, at block 919.

When the execution replay is in a Windows system, the load phase may be performed by the agent 517 using Windows application program interfaces (APIs) and an instrumentation tool such as "Pin" described by Luk et al. in the paper entitled "Pin: Building Customized Program Analysis Tools With Dynamic Instrumentation," PLDI '05: Proceedings of the 2005 ACM SIGPLAN Conference on Programming Language Design and Implementation, ACM Press, June 2005. As each program thread makes a special system call, which a Pin tool interface intercepts and invokes the Pin tool to perform the re-execution phase of the replay. The agent 517 reads the respective log file of the thread from the checkpoint 518 to obtain its saved processor context 519 and loads it using the Pin tool's PIN ExecuteAt API function.

The agent 517 continues to monitor the program 514 to satisfy the requests that the program 514 makes during its execution. As the program 514 makes a Linux system call, the Pin tool traps the system call interrupt instruction, copies system call return data to the program 514, increments the instruction pointer to skip the system call instruction and allows the program 514 to continue normally. In particular, when new memory regions are mapped, respective memory pages that will be accessed by the program 514 are brought into system memory using the Windows API. Program events related to the processor's MMU (memory management unit) are treated through a trap and emulate mechanism. Windows configures the CPU descriptor tables based on its memory layout which is different from that of Linux. A segment selector, which is an index into the segment descriptor table, used by a Linux application may point to a different region of memory on Windows or may not be valid at all. Also, any attempts to update the Windows descriptor tables may result in a conflict with the way Windows uses its memory resources. The invention resolves these conflicts by intercepting and emulating the offending instructions within the Linux application's binary and the system calls that modify the descriptor tables.

Figure 10:
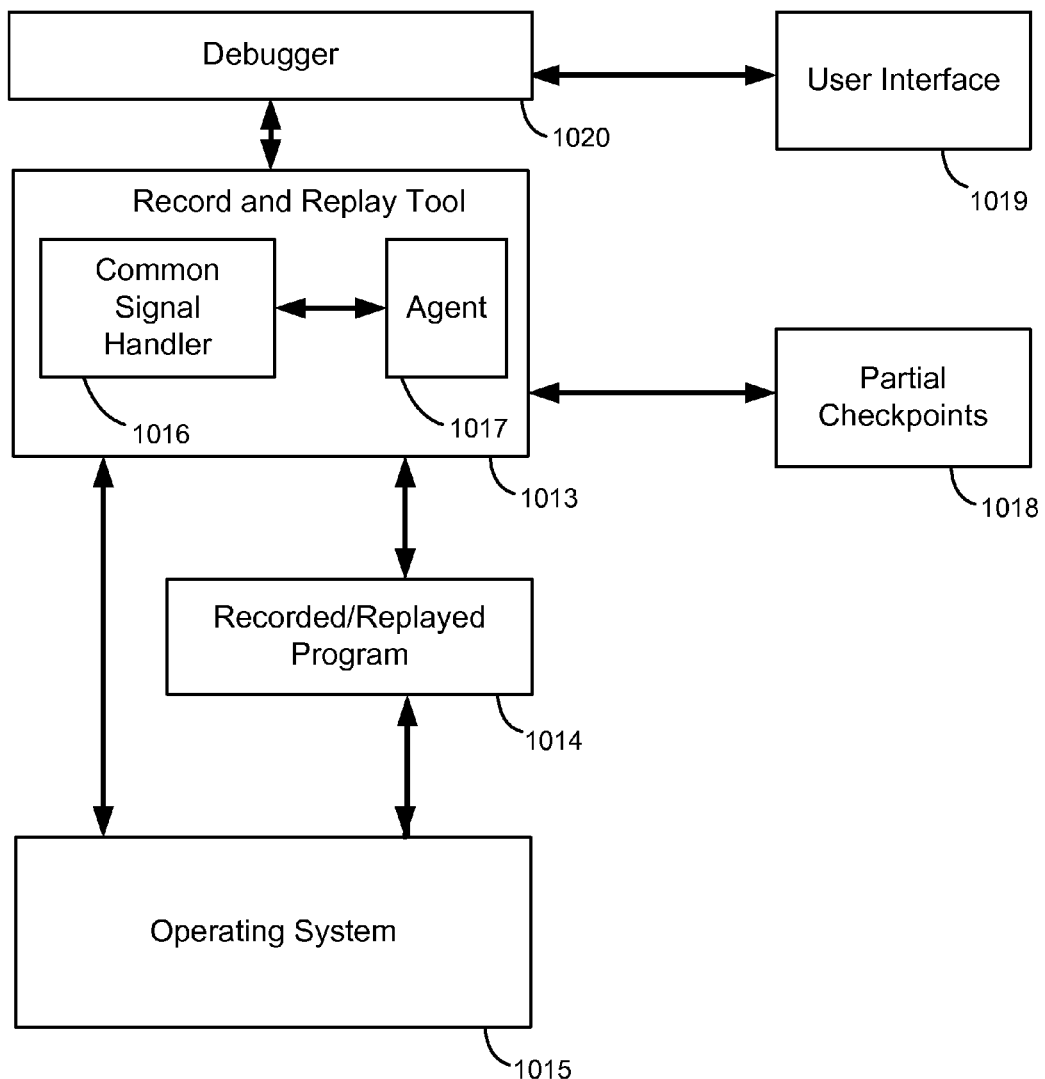
FIG. 10 is a block diagram showing an exemplary embodiment of the record and replay system of the invention that is integrated with a debugger and an interface to allow a user to control the recording and replaying of a program execution.

The record and replay tool as described may be integrated with a user interface and a debugger to provide user control of program recording and replaying as well as debug functions. FIG. 10 shows an exemplary embodiment of the record and replay tool 1013 integrated with a user interface 1019 and a program debugger 1020. The debugger 1020 may be a GNU Project Debugger (GDB) which allows backward and forward execution, single-stepping and contents of various program variables to be examined and program interactions to be monitored. Reverse debugging can also be done by resuming the program execution from an earlier partial checkpoint with a breakpoint set to a desired point of execution in the past.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer-implemented method, comprising:
recording a processor context for each thread of a program in a partial checkpoint;
recording results of system calls made by the program in the partial checkpoint; and
recording memory pages accessed by the program in the partial checkpoint, wherein the computer-implemented method further comprises:
creating a shadow process for each program process being executed;
in response to an accessed memory page being modified by a program process, recording an original copy of the modified memory page obtained from the shadow process in the partial checkpoint; and replaying a program execution in a different operating system using the partial checkpoint.

2. The computer-implemented method of claim 1, wherein results of the system calls are recorded for each thread of the program and the accessed memory pages are recorded for each process of the program.

3. The computer-implemented method of claim 1, wherein the accessed memory pages include data pages accessed by the program process and library code pages executed by the program process.

4. The computer-implemented method of claim 1, wherein the replaying comprises loading the accessed memory pages into a system memory and loading the processor context into a system processor using the partial checkpoint.

5. The computer-implemented method of claim 1, wherein the replaying comprises restoring program threads and segment descriptors in an operating system using the partial checkpoint.

6. The computer-implemented method of claim 1, wherein the replaying comprises intercepting a program instruction that accesses an operating system segment descriptor table and emulating the program instruction to avoid memory conflicts.

7. A system, comprising:
a processor for executing a program;
a common signal handler for intercepting inputs to the program from external processes;
an agent coupled to the common signal handler for recording in a partial checkpoint a processor context for each program thread, results of system calls made by the program, and memory pages accessed by the program; and
a kernel extension for alerting the agent when the system calls are made by the program, wherein the partial checkpoint is used to reconstruct an execution state of the program in a replay, and wherein the processor performs:
creating a shadow process for each program process being executed;
in response to an accessed memory page being modified by a program process, recording an original copy of the modified memory page obtained from the shadow process in the partial checkpoint; and
replaying the program execution in a different operating system using the partial checkpoint.

8. A computer program product, wherein the computer program product comprises a computer readable storage medium having program code embodied therein and operable for:

recording a processor context for each thread of a program in a partial checkpoint;
recording results of system calls made by the program in the partial checkpoint; and
recording memory pages accessed by the program in the partial checkpoint, wherein the program code is further operable for:
creating a shadow process for each program process being executed;
in response to an accessed memory page being modified by a program process, recording an original copy of the modified memory page obtained from the shadow process in the partial checkpoint; and
replaying a program execution in a different operating system using the partial checkpoint, wherein the computer readable storage medium is not a signal medium.

9. The computer program product of claim 8, wherein results of the system calls include returned call value and parameter data, and are recorded as a continuous log in the partial checkpoint.

10. The computer program product of claim 8, wherein the accessed memory pages are determined based on "accessed" and "dirty" bits maintained by an operating system.

11. The computer program product of claim 8, wherein if a memory page is modified by the program process, then an unmodified copy of the modified memory page is recorded in the partial checkpoint instead of the modified memory page, and the unmodified copy of the modified memory page is obtained from the shadow process of the program process.

12. The computer program product of claim 8, wherein the accessed memory pages are maintained in a data structure having unique page addresses and associated page data.

13. The computer program product of claim 8, wherein a recording is started and stopped by control commands from an external process.

14. The computer program product of claim 8, wherein the partial checkpoint is maintained in a system memory and written to a persistent storage when a recording ends.

15. The computer program product of claim 8, wherein if the program encounters a failure at the beginning of a recording interval, then a series of consecutive partial checkpoints are spliced into a new checkpoint encompassing the series of consecutive partial checkpoints and the failure.

16. The computer program product of claim 8, wherein the system calls are tracked by an extension to an operating system kernel, and wherein the extension alerts a respective program thread when a system call is made.

17. The computer program product of claim 8, wherein the processor context includes register contents and descriptor entries in a segment descriptor table of an operating system.

* * * * *